United States Patent [19]

MacDonald et al.

[11] Patent Number: 4,783,850
[45] Date of Patent: Nov. 8, 1988

[54] OPTOELECTRONIC COMPOUND SWITCHING MATRIX

[75] Inventors: Robert I. MacDonald, Ottawa; Kenneth O. Hill, Kanata, both of Canada

[73] Assignee: Canadian Patents and Development Limited-Societe Canadienne des Brevets et D'Exploitation Limitee, Ottawa, Canada

[21] Appl. No.: 586,776

[22] Filed: Mar. 7, 1984

[51] Int. Cl.$^4$ .............................................. H04B 9/00
[52] U.S. Cl. ........................................ 455/600; 370/3; 455/617
[58] Field of Search ........................ 455/600, 606, 607; 179/18 GF; 340/825.03, 619, 617, 609; 370/3, 69.1; 358/86

[56] References Cited

U.S. PATENT DOCUMENTS

| | | | |
|---|---|---|---|
| 3,882,538 | 5/1975 | Lowe | 370/124 |
| 4,156,135 | 5/1979 | Miller, Jr. et al. | 455/619 |
| 4,484,218 | 11/1984 | Boland et al. | 358/86 |
| 4,530,084 | 7/1985 | Strebel et al. | 370/3 |

OTHER PUBLICATIONS

Schrock, C. B., "Proposal for a Hub Controlled Cable Television System Using Optical Fiber", *IEEE Trans. on Cable TV*, vol catv-4, No. 2. Apr. 1979.

MacDonald, R. I., "Optoelectronic Broadband Switching Array", *Electronics Letters*, vol. 14, No. 16, Aug. 3, 78.

Davis et al., "Optical & Electronic Mixing in an Avalanche Photodiode", *Electronics Letters*, v. 6, No. 2, Jan. 22, 1970, pp. 25 & 26.

MacDonald & Hara-Researchers Open Pathway–Canadian Elect. Eng., Apr. 1980, vol. 24, #4, pp. 18–20.

*Primary Examiner*—Robert L. Griffin
*Assistant Examiner*—Leslie Van Beek
*Attorney, Agent, or Firm*—Pascal & Associates

[57] ABSTRACT

Optoelectronic switching matrix which switches multiplexed input signals to narrowband output lines. Each crosspoint of the matrix is comprised of a heterodyning photosensor, which optically receives the multiplexed input signal and electrically receives a selectable local oscillator signal. The difference frequency can thus be selected to be within the passband of a low pass filter whereby narrowband output signals can be received from the input signals without requiring the use of a demultiplexer.

27 Claims, 2 Drawing Sheets

OPTOELECTRONIC COMPOUND SWITCHING MATRIX

BACKGROUND TO THE INVENTION

This invention relates to optoelectronic signal switching apparatus and in particular to a switching matrix which facilitates switching of multiplexed input signals to output lines.

The widespread introduction of optoelectronic signal switching matrices depends to a large extent on the cost of the crosspoint switch used in the matrix. It is highly desirable to use broadband switching crosspoints in the matrix, and particularly to use crosspoints with photodetectors which have gain. Where each broadband input signal must be switched at a single crosspoint to a single output line, clearly the achievement of these criteria, with a high quality photodetector, introduces high cost.

In the article by A. G. Foyt et al, "InP Optoelectronic Mixers, SPIE Volume 269 - Integrated Optics (1981), p. 189ff, (1981)" an InP optoelectronic switch is described in which the switch is used as a mixer. In this design a local oscillator signal is introduced by impinging on a photodetector, which signal modulated light, is mixed with an electrical input signal. This form of crosspoint switch however does not provide isolation between the output signal and the input signal as is highly desirable and is obtained in the crosspoint switch described in U.S. Pat. No. 4,286,171 issued Aug. 25th, 1981 invented by E. H. Hara et al, and in the crosspoint switch described in U.S. Pat. No. 4,369,371 issued Jan. 18th, 1983, invented by E. H. Hara et al.

In the article AVALANCHE OPTOELECTRONIC DOWN CONVERTER, by R. I. MacDonald and K. O. Hill, *Optics Letters*, volume 7, no. 2, February 1982, pages 83ff, the phenomenon of optoelectronic heterodyning is reported in an avalanche photodiode. A local oscillator signal is applied to a biased avalanche photodiode, which receives another signal simultaneously via a light beam (optical signal). We have found that this and other devices can be used to form an optoelectronic compound switch matrix as will be described below.

One of the ways of decreasing the cost of a switching crosspoint is to multiplex a group of input signals which are broadband switched at a switching crosspoint, and which are separated via demultiplexers connected to the output ports of the matrix. Such a switching matrix can be realized by the use of the crosspoint switch described in the aforenoted U.S. Pat. Nos. 4,286,171 and 4,369,371.

However in the present invention we have found a way to eliminate the costly demultiplexers and the wideband output ports. Instead, narrow band output ports can be used merely connected to lowpass or bandpass filters.

SUMMARY OF THE INVENTION

The present invention is realized by utilizing as a switching crosspoint an element which accomplishes both the switching matrix function and a heterodyne frequency shifting function at the same time. Accordingly a selected one of a set of frequency division multiplexed input signals, or a selected one from a set of frequency division signal groups available can be delivered to narrow band lines and ports. The frequency of the input signal is shifted by the heterodyning action so that only the desired signal will pass through the filter connected to each output line or port.

According to a preferred aspect of the invention, an optoelectronic switching matrix as described above is realized by the combination of an optical signal source for providing a frequency division multiplex carrier signal, a photosensitive element illuminated by the optical signal source, at least one local oscillator signal source, apparatus for coupling the local oscillator signal to the photosensitive element, a source of control signals, an output port in circuit communication with the photosensitive element, and a circuit for controlling the operation of the photosensitive element by the control signal whereby an output signal can be received at the output port comprised of the output signal heterodyned in the photosensitive element by the local oscillator signal.

In another aspect of the invention apparatus is provided in circuit communication with the output port for distinguishing one of the signals carried by one of the carrier signals. Preferably the distinguishing circuit is comprised of a filter connected to the output port having a passband which has a nominal center frequency which is the difference between the predetermined local oscillator signal frequency and the center frequency of a predetermined one of the signals carried by the carrier signal.

While it is presently preferred that the photosensitive element should be selected from the group consisting of an avalanche photodiode and a broadband photoconductive photodetector, any controllable photosensitive element which provides the function of an electronic mixing detector can be utilized. In the present patent application, the use of the term photosensitive element is intended to mean a controllable optoelectronic mixing detector.

The local oscillator signal can be one which can be tuned by a tuning or other control signal, or can be separate frequency fixed local oscillator signals which are selectively switched into circuit communication with the photosensitive element.

BRIEF INTRODUCTION TO THE DRAWINGS

A better understanding of the invention will be obtained by reference to the detailed description below, and to the following drawings, in which.

DESCRIPTION OF THE PREFERRED EMBODIMENT

Figure 1:
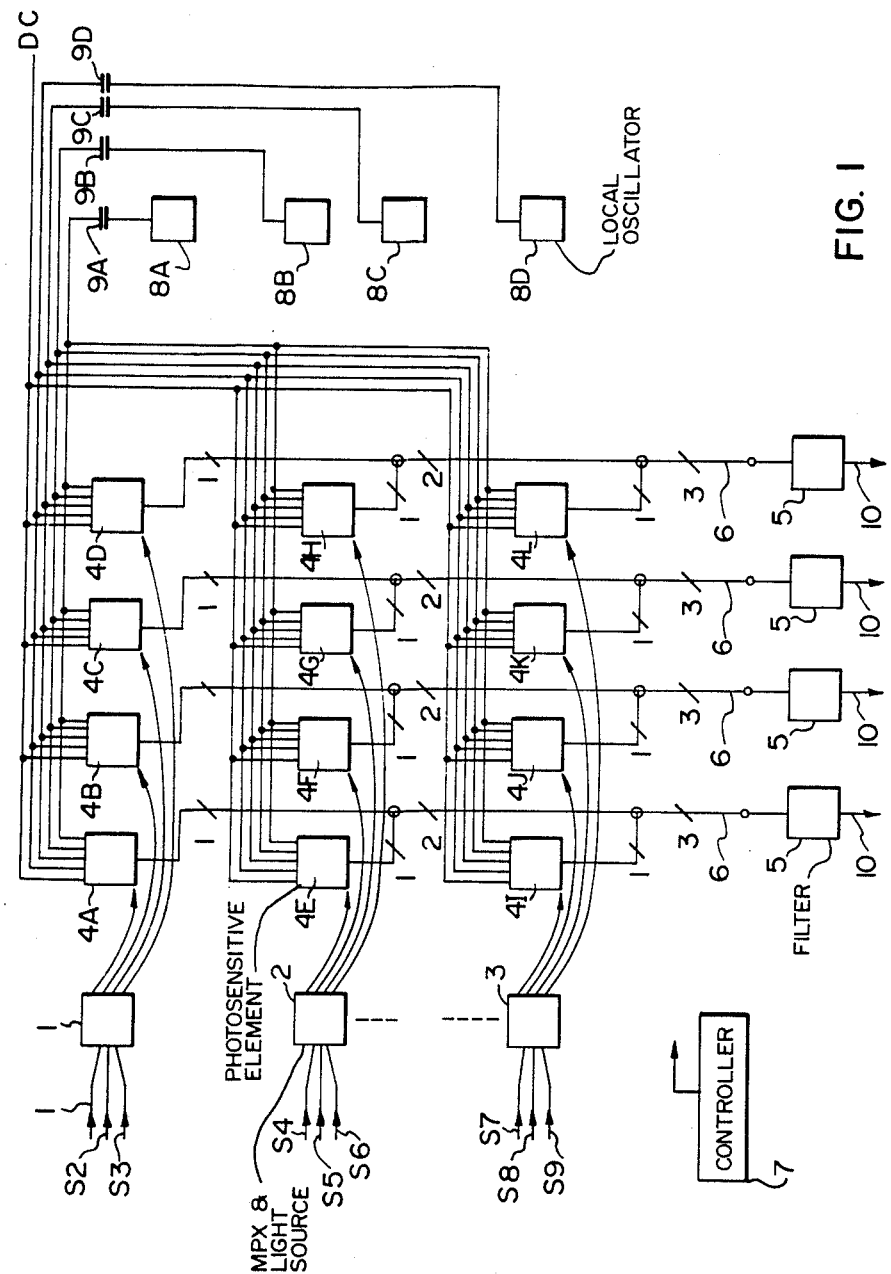
FIG. 1 is a block schematic of a compound optoelectronic switch matrix according to a first embodiment of the invention.

Turning to FIG. 1, three separate representative input signal sources are connected to a multiplexer which includes a transmitting light source, for each row of the switch matrix. Thus input signal sources S1, S2 and S3 are connected to a multiplexer and light source 1, input signal sources S4, S5 and S6 are connected to multiplexer and input light source 2, and signal sources S7, S8 and S9 are connected to multiplexer and light source 3. The multiplexers 1, 2 and 3 are of conventional construction, electrically frequency multiplexing the signals. The resulting signals are used to modulate an optoelectronic light source such as an appropriately biased light-emitting diode, a semi-conductor laser or the like. Thus each multiplexer and light source combination emits a light carrier signal modulated by the frequency multiplexed input signals, the light from multiplexer and light source 1 carrying the frequency multiplexed signals from sources S1-S3, the light from multiplexer and light source 2 carrying the frequency multiplexed signals from sources S4-S6 and the light from multiplexer and light source 3 carrying the frequency multiplexed signals from sources S7-S9. In the embodiment shown, therefore, there are nine input signals multiplexed into 3 broadband optoelectronic signals.

Each of the light sources is coupled to a photosensitive element 4A-4L; that is, light source 1 is coupled to the photosensitive elements of crosspoint switches 4A-4D, light source 2 is coupled to the photosensitive elements of crosspoint switches 4E-4H, and light source 3 is coupled to the photosensitive elements of crosspoint switches 4I-4L. The coupling means can be through conventional optoelectronic structures, such as lenses, optical fibers, etc.

Local oscillators 8A-8D are AC coupled via capacitors 9A-9D to the photosensitive elements in parallel. The frequency of each of the local oscillators is different from the others.

To switch a particular input signal or group of input signals to a particular output line, one of the photosensitive elements 4A-4L is enabled by means of a DC supply source switched to it (not shown in FIG. 1, but described later with respect to FIG. 2). At the same time one of the signals from one of the local oscillators 8A-8D is applied to the crosspoint. Once enabled, the photosensitive element simultaneously translates the optoelectronic input signal to an output electrical signal and heterodynes the input signal to the local oscillator signal. The difference signal appears at the input of the corresponding output filter means 5, which passes the narrow band signal to an output line 10.

The outputs of each of the crosspoint switches 4A-4L are connected to filter means 5, via narrow band lines 6. Each filter means 5 actually represents one filter according to the basic embodiment (or in another embodiment four filters) connected to each end of the output lines leading to the three photosensitive elements in a column. Thus there are, in the basic embodiment, four output filters. The matrix thus forms a nine input by four output array, one narrowband signal derived from an input signal S1-S9 appearing at the output of one of the four filters, no matter what appears on the other other output lines.

As will be noted, in the second embodiment each of the groups of four filters is identical, and therefore it will become evident to a person skilled in the art that the filters can be combined or switched to an appropriate narrow band line via logic driven from a matrix controller 7 which is of conventional construction and controls the matrix to provide the switched functions noted below. Thus assuming that the traffic tnrough the matrix allows, as few as four output filters may be used in the design described above, switched to an appropriate line as may be required.

It should be noted that there are several variations of this structure which could be used. For example, since the three multiplexed input signals switched via an enabled crosspoint are all heterodyned, the difference signal representing all three of the input signals could be passed through output filters 5 if the passband of filter 5 is made wide enough.

If the passband of filter 5 is made sufficiently narrow to pass only one of the frequency multiplexed signals, only one of the input signals passes through and appears on the output line 10. Thus the frequency of local oscillator 8A-8D can be chosen in concert with the design of the output filters to allow the output filters to be relatively inexpensive, i.e. lowpass filter rather than bandpass filters.

It should also be noted that in some designs it may be desirable to apply only a single local oscillator signal frequency to the photosensitive element, and to switch the output filters to select a single one of the input signals, or a group.

According to a further embodiment, the local oscillator is not fixed in frequency, but is tunable. A control signal is used to control the frequency of the local oscillator, which will determine which of the output filters within a group of filters connected to a crosspoint element will pass a signal to an output line.

Thus it may be seen that by controlling the frequency of a local oscillator signal, or the bandpass frequency of an output filter, broadband frequency multiplexed input signals can be switched to narrowband output lines without the requirement for expensive demultiplexers.

Figure 2:
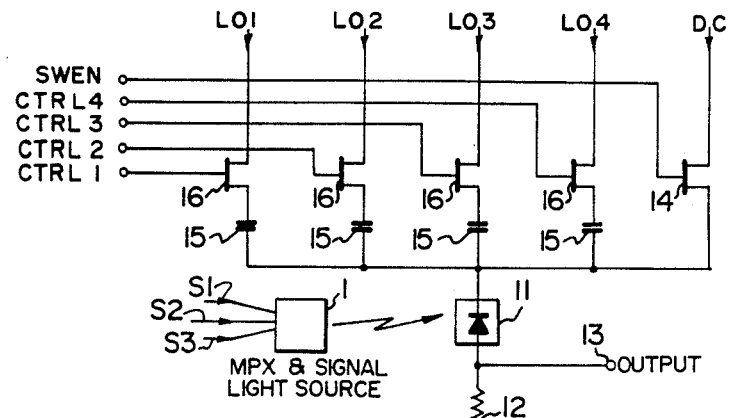
FIGS. 2 and 3 are schematic diagrams of crosspoints which can be used in the switch matrix.

Turning now to FIG. 2, an embodiment of a crosspoint switch which is incorporated in each of the blocks 4A-4L is shown. A multiplexer and light source 1, similar to the corresponding elements 1, 2 or 3 in FIG. 1, applies an optoelectronic light signal to a photosensitive element 11. The photosensitive element can be an avalanche photodiode as shown, or can be a photoconductive photodetector which can operate as a mixer such as that described in the article by R. I. MacDonald, E. H. Hara and R. H. Hum entitled FAST PHOTOCONDUCTIVE OPTOELECTRONIC BROADBAND SWITCH WITH LOW CONTROL VOLTAGE, Electron Letters 17, pages 611-612, 1981. While other photosensitive devices could be used, the avalanche photodiode and the broadband photoconductor are presently preferred. The photosensitive element 11 is connected through a load resistor 12, the junction of which is connected to an output port 13.

The other terminal of the photosensitive element is connected through an FET switch 14 to a source of direct current, i.e. the DC line shown in FIG. 1. The gate of FET switch 14 is connected to a terminal SWEN for reception of a switch enabling signal.

The junction between switch 14 and the photosensitive element is also connected via coupling capacitors 15 and FET switches 16 to separate local oscillators via local oscillator lines LO1, LO2, LO3 and LO4. The gates of switches 16 are connected to terminals CTRL1-CTRL4 for receiving switch enabling control signals.

Upon receipt of a control signal on the SWEN terminal, the DC line is applied to the photosensitive element 11 in a similar manner as that described in the aforenoted U.S. Pat. Nos. 4,286,171 and 4,369,371. However at the same time a control signal is applied to one of FET switches 16, thus extending a local oscillator signal to the photosensitive element. The local oscillator signal is mixed with the multiplexed optoelectronic input signal, and a signal consisting of the difference frequencies (as well as the sum frequencies) appears across load 12. An output signal voltage can be obtained across the output port and ground. This output signal is applied to a bandpass, or preferably, a lowpass filter as described with reference to FIG. 1, whereby a narrowband signal corresponding to a selected one of the input signals is obtained.

Figure 3:
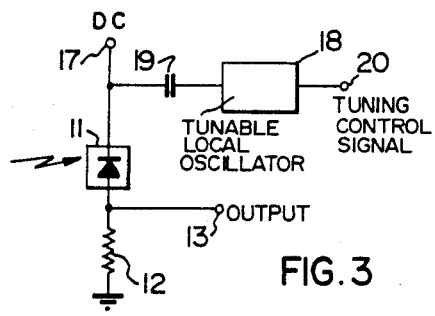

FIG. 3 shows a second embodiment of a crosspoint structure. A light source as described earlier impinges on photosensitive element 11, which is similar to the one shown in FIG. 2. A DC source (which can be switched as described with reference to FIG. 2) is applied to terminal 17, for enabling the photosensitive element. However in the embodiment of FIG. 3, rather than having a separate fixed frequency oscillator. a tunable local oscillator 18 is AC coupled, e.g. via capacitor 19, to photosensitive element 19. A tuning control signal is applied to local oscillator 18 via terminal 20.

In order to select a particular input signal which has been applied to the crosspoint, the photosensitive element 11 is enabled by application of bias current at terminal 17, and a control signal which selects the frequency of the local oscillator 18 is applied to terminal 20. This signal is applied to photosensitive element 11 with the optoelectronic signal carrying the frequency multiplexed signal, and the sum and difference signals appear across load resistor 12. This signal can be detected between output terminal 13 and ground, and is passed through a filter.

In the case of both embodiments of FIGS. 2 and 3, and as an alternative to the plurality of filters described with reference to FIG. 1, only one lowpass filter need be connected to the output terminal 13. The frequency of the local oscillator signal, whether switched by means of FET switches 16, or whether selected by a control signal applied to terminal 20, causes a local oscillator signal of exactly the correct frequency to be applied to the photosensitive element and generate a difference frequency from the particular signal of the frequency multiplexed input signal which is intended to be selected to appear within the lowpass frequency characteristics of the filter. The tuning control or switch control signal is obtained by conventional means from a controller.

Figure 4:
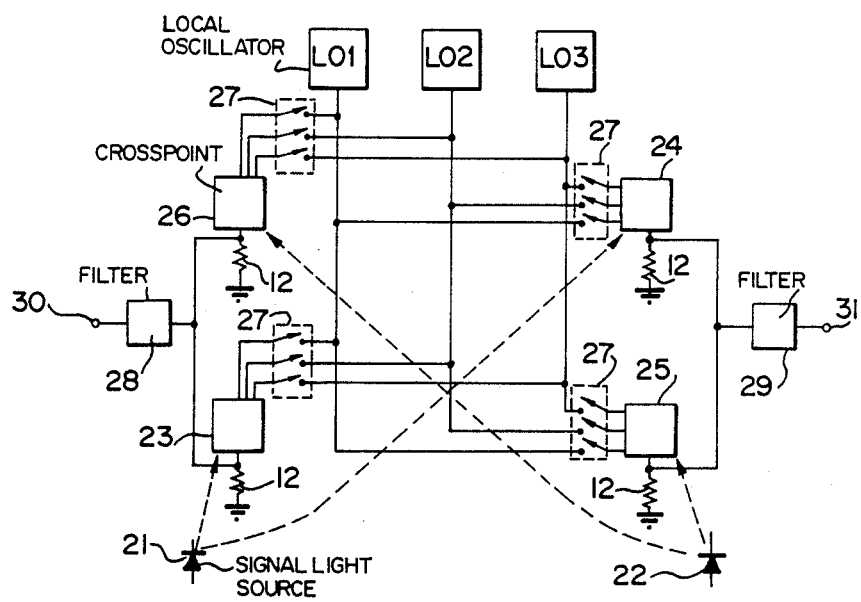
FIG. 4 is a block schematic of another embodiment of the invention.

FIG. 4 is a block diagram illustrating another embodiment of the invention. Each of two optoelectronic signal light sources 21 and 22 carries three frequency division multiplexed input signals. There are thus six separate input signals. Light source 21 is optoelectronically coupled to crosspoint elements 23 and 24, and light source 22 is similarly coupled to crosspoints 25 and 26. The crosspoints are connected similarly to those described with reference to FIG. 2. However the one shown in FIG. 3 could be used with appropriate circuitry variations, or other crosspoints which use the principles of this invention. The crosspoints each have load resistors 12 connected to ground as shown in FIG. 2.

Three local oscillators LO1, LO2 and LO3 are provided, having different frequencies from each other. It is preferred that the frequencies should be such that their differences from the frequencies of the multiplexed signals of either of the input signals should be between DC or a low frequency or a required passband for any single one of the frequencies.

Each of the crosspoints is connected via switch array 27 to the local oscillators, each of the switches in array 27 being similar to switches 16 of FIG. 2, and can operate under control of a controller. The DC enabling lines for each of the crosspoints are not shown, as they are evident from FIG. 2.

The output terminals of crosspoint elements 23 and 26 are connected to the input of lowpass filter 28, and the output terminals of crosspoint elements 24 and 25 are connected to the input of lowpass filter 29. The output signals of the matrix are obtained at narrowband output ports 30 and 31.

In operation, the three multiplexed input signals are wideband coupled as described earlier to optoelectronic crosspoint elements 25 and 26. One of the switches of switch bank 27 associated with crosspoint element 26 or 25 is closed, thus extending one of the local oscillator signals to the photosensitive elements in one of the two crosspoints. Of course that particular crosspoint is also enabled by the extension of DC bias (enabling) voltage as described with reference to FIG. 2, enabling it. The local oscillator signal extended to the crosspoint thus is mixed with all three of the frequency multiplexed input signals, and the one signal which fits the passband of filter 2S or 29 passes through it, and appears at output terminal 30 or 31.

A similar function occurs with respect to the three multiplexed input signals appearing at the other crosspoint element, resulting in one of the input signals appearing on the other of the output terminals 30 or 31.

As a result, it may be seen that any two of six input signals can be optoelectronically switched to appear on any of the two output terminals. This matrix thus forms a six by two optoelectronic switching matrix.

Of course the numbers of the signals multiplexed by the input lines can be as many as desired within the limitations of the components and thus the number of local osillators used will depend on the specific design. Indeed the number of local oscillators is preferred to be similar to the maximum number of frequencies multiplexed in the input signals carried by any one of the broadband light source, in the case using a lowpass output filter. The size of the matrix thus is only limited by the design requirements and component limitations.

As an example, the number of multiplexed channels per input group is likely to be determined by the linearity and power output capabilities of convenient optical sources. Transmission of, for example, twenty-six television channels over a single optical link with a loss of 2.6 dB excluding coupling has been achieved with 38 dB unweighted signal to noise ratio (see C. Baack et al, "ANALOG OPTICAL TRANSMISSION OF 26 TV CHANNELS", Electron Letters 15, pages 300-301, 1971). An estimate of the size Q for a matrix can be obtained by taking the power and the electrical signal as a constant, so that the amount of optical power required varies with the square root of the number of channels. Based on the results noted above, an estimate as between the number of multiplexed channels per group and the size Q is obtained by $Q = 8.66/ N$, where N is the number of multiplexed channels per group. Thus the number of output lines served by a single source could vary from 2, where there are eighteen channels multiplexed in each group, to six, where there are two channels multiplexed per group. This estimate is very conservative because the results cited above were obtained with a single mode fiber link, and the input coupling loss is not included in the determination.

It should be noted that there is a further advantage to the use of narrowband output lines. A low frequency band allows the use of a load resistor that can be a high value. This reduces the noise in the output circuit, helping to maintain a high signal to noise ratio.

The frequency multiplexer for combining the various input signals can be an electrical multiplexer which is connected to modulate the light source, or alternatively, several optical intensity modulated signals having different electrical carrier frequencies can be combined by means of optical power combining. Mixing-rod power combiners or biconical taper star couplers are suitable for this purpose. An advantage of the optical combination is that the linearity required for each optical source is less extreme than is required to place an electrically multiplexed signal on an optical carrier by direct modulation of the source. Non-linear behaviour in the source would cause cross-talk between the frequency division channels if the multiplexing were done electrically, before application to the optical light source.

A person understanding this invention may now conceive of alternative embodiments or variations in design based on the principles described herein. All are considered to be within the scope of this invention as defined in claims appended hereto.

We claim:

1. An optoelectronic switching matrix comprising:
   (a) an optical signal source for providing a frequency division multiplexed optical carrier signal formed of a plurality of frequency multiplexed input signals intensity modulated on the optical carrier,
   (b) a plurality of photosensitive elements illuminated by the optical signal source,
   (c) at least one local oscillator signal source providing at least one local oscillator signal,
   (d) means for coupling said at least one local oscillator signal to the photosensitive elements,
   (e) a source of control signals,
   (f) a plurality of output ports each in circuit communication with a corresponding one of the photosensitive elements,
   (g) circuit means for enabling the photosensitive elements by the control signals whereby an output signal can be received at one of the output ports comprised of a predetermined selected one of the input signals heterodyned in a photosensitive element by said at least one local oscillator signal.

2. An optoelectronic switching matrix as defined in claim 1, further comprising means in circuit communication with said one of the output ports for distinguishing one of the signals carried by the carrier signal.

3. An optoelectronic switching matrix as defined in claim 1, further comprising signal translation means connected to said one of the output ports having a passband which has a nominal center frequency which is the difference between a predetermined local oscillator signal frequency and the center frequency of a predetermined one of the signals carried by the carrier signal.

4. An optoelectronic switching matrix as defined in claim 1, in which the photosensitive element is comprised of an optoelectronic mixing detector.

5. An optoelectronic switching matrix as defined in claim 1, in which the photosensitive element is selected from the group consisting of an avalanche photodiode and a broadband photoconductive photodetector.

6. An optoelectronic switching matrix as defined in claim 1, in which the photosensitive element is comprised of an avalanche photodiode.

7. An optoelectronic switching matrix as defined in claim 3 in which the signal translation means is comprised of a filter.

8. A optoelectronic switching matrix which includes a crosspoint comprising:
   (a) means for providing an optical signal formed of a plurality of frequency multiplexed input signals,
   (b) a plurality of optoelectronic mixing detector photosensitive elements, for receiving the optical signal,
   (c) means for providing an electrical local oscillator signal of selectable frequency,
   (d) means for applying the local oscillator signal to the photosensitive elements whereby it is mixed with the received multiplexed input signals to form a plurality of heterodyned signals,
   (e) means for coupling at least a predetermined one of the heterodyned signals to an output port.

9. An optoelectronic switching matrix as defined in claim 8, in which the means for providing a local oscillator signal is comprised of a selectively tune local oscillator.

10. An optoelectronic switching matrix as defined in claim 8 in which the means for providing a local oscillator signal is comprised of a plurality of sources of local oscillator signals each having a different local oscillator frequency, means for selectively switching one of the sources into circuit communication with a photosensitive element whereby a heterodyned signal is produced, and means for coupling a heterodyned signal of a predetermined frequency resulting from the difference between the frequency of said one local oscillator signal source and the frequency of a predetermined one of the multiplexed signals to said output port.

11. An optoelectronic switching matrix which includes a crosspoint comprising:
   (a) means for providing an optical signal formed of a plurality of frequency multiplexed input signals,
   (b) a plurality of optoelectronic mixing detector photosensitive elements, for receiving the optical signal,
   (c) means for providing a local oscillator signal of selectable frequency,
   (d) means for applying the local oscillator signal to the photosensitive elements, whereby it is mixed with the received multiplexed input signals to form a plurality of heterodyned signals,
   (e) in which the means for providing a local oscillator signal is comprised of a plurality of sources of local oscillator signals each having a different local oscillator frequency,
   (f) means for selectively switching one of the sources into circuit communication with a photosensitive element whereby a heterodyned signal is produced,
   (g) means for coupling a heterodyned signal of a predetermined frequency resulting from the difference between the frequency of said one local oscillator signal source and the frequency of a predetermined one of the multiplexed signals to an output port, and
   (h) the switching means being comprised of a plurality of FET switches each serially connected between a local oscillator signal source and a photosensitive element.

12. An optoelectronic switching matrix as defined in claim 11 in which the coupling means is comprised of at least one filter.

13. An optoelectronic switching matrix as defined in claim 12 in which the coupling means is comprised of a group of filters.

14. An optoelectronic switching matrix as defined in claim 12 in which the photosensitive element is comprised of an avalanche photodiode.

15. An optoelectronic switching matrix which includes an array of crosspoints, each comprising:
   (a) means for providing an optical siganl formed of a plurality of frequency multiplexed input signals,
   (b) a plurality of optoelectronic mixing detector photosensitive elements, for receiving the optical signal,
   (c) means for providing a local oscillator signal of selectable frequency,
   (d) means for applying the local oscillator signal to the photosensitive elements, whereby it is mixed with the received mutliplexed input signals to form a plurality of heterodyned signals,
   (e) in which the means for providing a local oscillator signal is comprised of a plurality of sources of local oscillator signals each having a different local oscillator frequency,
   (f) means for selectively switching one of the sources into circuit communication with a photosensitive element whereby a heterodyned signal is produced,
   (g) means for coupling a heterodyned signal of a predetermined frequency resulting from the difference between the frequency of said one local oscillator signal source and the frequency of a predetermined one of the multiplexed signals to an output port,
   the sources of local oscillator signals being connectable in common to each of the photosensitive elements.

16. An optoelectrionic switching matrix which includes an array of crosspoints each as defined in claim 12, in which the sources of local oscillator signals are connectble in common to each of the photosensitive elements, and in which the filter or filters are lowpass filters adapted to pass a group or groups of heterodyned multiplexed signals.

17. An optoelectronic switching matrix which includes an array of crosspoints, each comprising:
   (a) means for providing an optical signal formed of a plurality of frequency multiplexed input signals,
   (b) a plurality of optoelectronic mixing detector photosensitive elements, for receiving the optical signal,
   (c) means for providing a local oscillator signal of selectable frequency,
   (d) means for applying the local oscillator signal to the photosensitive elements, whereby it is mixed with the received multiplexed input signals to form a plurality of heterodyned signals,
   (e) in which the means for providing a local oscillator signal is comprised of a plurality of sources of local oscillator signals each having a different local oscillator frequency,
   (f) means for selectively switching one of the sources into circuit communication with a photosensitive element whereby a heterodyned signal is produced,
   (g) means for coupling a heterodyned signal of a predetermined frequency resulting from the difference between the frequency of said one local oscillator signal source and the frequency of a predetermined one of the multiplexed signals to an output port,
   the sources of local oscillator signals being connectable in common to each of the photosensitive elements, a plurality of optical signal providing means each for providing an optical signal formed of a different group of frequency multiplexed input signals, each optical signal providing means being coupled to one or more photosensitive elements, and said coupling means being comprised of a plurality of filter means each in circuit communicaiton with different photosensitive elements carrying different groups of said frequency multiplexed signals, whereby all frequency multiplexed signals of different frequencies can be coupled via different photosensitive elements to each filter means.

18. An optoelectronic switching matrix comprising:
   (a) an optical signal source for providing a frequency division multiplexed carrier signal formed of a plurality of frequency multiplexed input signals,
   (b) a photosensitive element illuminated by the optical signal source,
   (c) at least one local oscillator signal source providing at least one local oscillator signal,
   (d) means for coupling said at least one local oscillator signal to the photosensitive element,
   (e) a source of control signals,
   (f) an output port in circuit communication with the photosensitive element,
   (g) circuit means for enabling the photosensitive element by a control signal whereby an output signal can be received at the output port comprised of a predetermined selected one of the input signals heterodyned in a photosensitive element by said at least one local oscillator signal,
   (h) means in circuit communication with the output port for distinguishing one of the signals carried by the carrier signal,
   (i) the photosensitive element being comprised of an optoelectronic mixing detector.

19. An optoelectronic switching matrix comprising:
   (a) an optical signal source for providing a frequency division multiplexed carrier signal formed of a plurality of frequency multiplexed input signals,
   (b) a photosensitive element illuminated by the optical signal source,
   (c) at least one local oscillator signal source providing at least one local oscillator signal,
   (d) means for coupling said at least one local oscillator signal to the photosensitive element,
   (e) a source of control signals,
   (f) an output port in circuit communication with the photosensitive element,
   (g) circuit means for enabling the photosensitive element by a control signal whereby an output siganl can be received at the output port comprised of a predetermined selected one of the input signals heterodyned in the photosensitive element by said at least one local oscillator signal,
   (h) signal translation means connected to the output port having a passband which has a nominal center frequency which is the difference between a predetermined local oscillator signal frequency and the center frequency of a predetermined one of the signals carried by the carrier signal,
   (i) the photosensitive element being comprised of an optoelectronic mixing detector.

20. An optoelectronic switching matrix comprising:
   (a) an optical signal source for providing a frequency division multipexed carrier signal formed of a plurality of frequency multiplexed input signals,
   (b) a plurality of photosensitive elements illuminated by the optical signal source, (c) at least one local oscillator signal source providing at least one local oscillator signal,
(d) means for coupling said at least one local oscillator signal to the photosensitive elements,
(e) a source of control signals,
(f) output ports each in circuit communications with a corresponding photosensitive element,
(g) circuit means for enabling a photosensitive element by a control signal whereby an output signal can be received at an output port comprised of a predetermined selected one of the input signals heterodyned in the photosensitive element by said at least one local oscillator signal,
(h) means in circuit communication with the output port for distinguishing one of the signals carried by the carrier signal,
(i) the photosensitive element being selected from the group consisting of an avalanche photodiode and a broadband photoconductive photodetector.

21. An optoelectronic switching matrix comprising:
(a) an optical signal source for providing a frequency division multiplexed carrier signal formed of a plurality of frequency multiplexed input signals,
(b) a plurality of photosensitive elements illuminated by the optical signal source,
(c) at least one local oscillator signal source providing at least one local oscillator signal,
(d) means for coupling said at least one local oscillator signal to the photosensitive element,
(e) a source of control signals,
(f) output ports in circuit communication with the photosensitive elements,
(g) circuit means for enabling a photosensitive element by a control signal whereby an output signal can be received at an output port comprised of a predetermined selected one of the input signals heterodyned in the photosensitive element by said at least one local oscillator signal,
(h) signal translation means connected to the output port having a passband which has a nominal center frequency which is the difference between a predetermined local oscillator signal frequency and the center frequency of a predetermined one of the signals carried by the carrier signal,
(i) the photosensitive element being selected from the group consisting of an avalanche photodiode and a broadband photoconductive photodetector.

22. An optoelectronic switching matrix comprising:
(a) an optical signal source for providing a frequency divsion multiplexed carrier signal formed of a plurality of frequency multiplexed input signals,
(b) a plurality of photosensitive elements illuminated by the optical signal source,
(c) at least one local oscillator signal source providing at least one local oscillator signal,
(d) means for coupling said at least one local oscillator signal to the photosensitive elements,
(e) a source of control signals,
(f) output ports each in circuit communication with a corresponding photosensitive element,
(g) circuit means for enabling a photosensitive element by a control signal whereby an output signal can be received at an output port comprised of a predetermined selected one of the input signals heterodyned in the photosensitive element by said at least one local oscillator signal,
(h) means in circuit communication with the output port for distinguishing one of the signals carried by the carrier signal,
(i) the photosensitive element being comprised of an avalanche photodiode.

23. An optoelectronic switching matrix comprising:
(a) an optical signal source for providing a frequency division multiplexed carrier signal formed of a plurality of frequency multiplexed input signals,
(b) a plurality of photosensitive elements illuminated by the optical signal source,
(c) at least one local oscillator signal source at least one local oscillator signal,
(d) means for coupling said at least one local oscillator signal to the photosensitive element,
(e) a source of control signals,
(f) output ports in circuit communication with the photosensitive elements,
(g) circuit means for enabling a photosensitive element by a control signal whereby an output signal can be received at an output port comprised of a predetermined selected one of the input signals heterodyned in the photosensitive element by said at least one local oscillator signal,
(h) signal translation means connected to the output port having a passband which has a nominal center frequency which is the difference between a predetermined local oscillator signal frequency and the center frequency of a predetermined one of the signals carried by ther carrier signal,
(i) the photosensitive element being comprised of an avalanche photodiode.

24. An optoelectronic switching matrix which includes an array of crosspoints each as defined in claim 12, in which the sources of local oscillator signals are connectable in common to each of the photosensitive elements.

25. An optoelectronic switching matrix which includes an array of crosspoints each as defined in claim 14, in which the sources of local oscillator signals are connectable in common to each of the photosensitive elements.

26. An optoelectronic switching matrix which includes a crosspoint comprising:
(a) means for providing an optical signal formed of a plurality of frequency multiplexed input signals,
(b) a plurality of optoelectronic mixing detector photosensitive elements, for receiving the optical signal,
(c) means for providing an electrical local oscillator signal of selectable frequency,
(d) means for applying the local oscillator signal to the photosensitive elements, whereby it is mixed with the received multiplexed input signals to form a plurality of heterodyned signals,
(e) in which the means for providing a local oscillator signal is comprised of a plurality of sources of local oscillator signals each having a different local oscillator frequency,
(f) means for selectively switching one of the sources into circuit communication with a photosensitive element whereby a heterodyned signal is produced, and
(g) means for coupling a heterodyned signal of a predetermined frequency resulting from the difference between the frequency of said one local oscillator signal source and the frequency of a predetermined one of the multiplexed signals to an output port.

27. An optoelectronic switching matrix comprising:
(a) an optical signal source for providing an optical carrier signal, formed of a plurality of frequency mutliplexed input signals,
(b) a plurality of photosensitive elements illuminated by the optical signal source,
(c) at least one local oscillator signal source providing at least one local osciltator signal,
(d) means for coupling said at least one local oscillator signal to the photosensitive elements,
(e) a source of control signals,
(f) an output port in circuit communication with each of the photosensitive elements,
(g) circuit means for enabling one of the photosensitive elements by a control signal whereby an output signal can be received at one of the output ports comprised of a predetermined selected one of the input signals heterodyned in said one of the photosensitive elements by said one local oscillator signal.

* * * * *